US012768265B2

(12) United States Patent
Mosse

(10) Patent No.: US 12,768,265 B2
(45) Date of Patent: Oct. 20, 2026

(54) APPARATUS AND METHOD FOR CHARACTERIZING LINER AND ANNULUS PROPERTIES WITH A GAMMA-GAMMA TOOL

(71) Applicant: Schlumberger Technology Corporation, Sugar Land, TX (US)

(72) Inventor: Laurent Mosse, Bucharest (RO)

(73) Assignee: Schlumberger Technology Corporation, Sugar Land, TX (US)

( * ) Notice: Subject to any disclaimer, the term of this patent is extended or adjusted under 35 U.S.C. 154(b) by 499 days.

(21) Appl. No.: 18/551,497

(22) PCT Filed: Mar. 16, 2022

(86) PCT No.: PCT/US2022/020568
§ 371 (c)(1),
(2) Date: Sep. 20, 2023

(87) PCT Pub. No.: WO2022/203918
PCT Pub. Date: Sep. 29, 2022

(65) Prior Publication Data

US 2024/0167377 A1 May 23, 2024

Related U.S. Application Data

(60) Provisional application No. 63/164,205, filed on Mar. 22, 2021.

(51) Int. Cl.

| | |
|---|---|
| ***E21B 47/085*** | (2012.01) |
| ***G01V 5/04*** | (2006.01) |
| ***G01V 5/12*** | (2006.01) |
| *E21B 49/00* | (2006.01) |

(52) U.S. Cl.
CPC ............ *E21B 47/085* (2020.05); *G01V 5/045* (2013.01); *G01V 5/12* (2013.01); *E21B 49/00* (2013.01)

(58) Field of Classification Search
CPC ........ E21B 49/00; E21B 49/005; E21B 47/08; E21B 47/085; E21B 47/00; E21B 47/005; G01V 5/04; G01V 5/045; G01V 5/08; G01V 5/10; G01V 5/101; G01V 5/102;
(Continued)

(56) References Cited

U.S. PATENT DOCUMENTS

| | | | |
|---|---|---|---|
| 4,129,777 | A | 12/1978 | Wahl |
| 4,585,939 | A | 4/1986 | Arnold |

(Continued)

FOREIGN PATENT DOCUMENTS

| | | | |
|---|---|---|---|
| GB | 2574256 | A | 12/2019 |
| WO | 2019236489 | A1 | 12/2019 |

OTHER PUBLICATIONS

Eyl et al., 1994 High-resolution density logging using a three detector device, SPE 28407, presented at the SPE Annual Technical Conference and Exhibition, Sep. 25-28, 1994 (14 pages).

(Continued)

*Primary Examiner* — Andrew Schechter
*Assistant Examiner* — Matthew W. Baca
(74) *Attorney, Agent, or Firm* — Jeffrey D. Frantz

(57) ABSTRACT

Embodiments presented provide for an apparatus and method for characterizing linear and annulus properties using a gamma-gamma tool.

13 Claims, 15 Drawing Sheets

(58) Field of Classification Search
CPC .......... G01V 5/104; G01V 5/105; G01V 5/12; G01V 5/125; G01V 5/14; G01V 5/145
See application file for complete search history.

(56) References Cited

U.S. PATENT DOCUMENTS

| | | | | |
|---|---|---|---|---|
| 7,294,829 | B2 * | 11/2007 | Gilchrist | G01V 5/101 250/266 |
| 9,322,949 | B2 | 4/2016 | Mosse | |
| 9,726,623 | B2 | 8/2017 | Guo | |
| 10,197,701 | B2 | 2/2019 | Stewart | |
| 10,209,395 | B2 | 2/2019 | Hu | |
| 2004/0210393 | A1 * | 10/2004 | Ellis | G01V 5/125 702/8 |
| 2011/0253364 | A1 * | 10/2011 | Mosse | G01V 5/125 175/50 |
| 2013/0261974 | A1 | 10/2013 | Stewart | |
| 2017/0261638 | A1 | 9/2017 | Moake | |
| 2019/0010800 | A1 | 1/2019 | Hu | |
| 2021/0373195 | A1 * | 12/2021 | Mamtimin | G01V 5/12 |

OTHER PUBLICATIONS

Allioli et al., 1997 A New Approach To Computing Formation Density and Pe Free of Mudcake Effects, Paper presented at the SPWLA 38th Annual Logging Symposium, Jun. 15-18, 1997 (14 pages).
Extended Search Report issued in European Patent Application No. 22776340.6 dated Jan. 22, 2025, 7 pages.
Plasek, R. et al., “Formation density meaurements in cased wellbores”, Petrophysics, SPWLA, 2011, 52(2), pp. 96-107.
International Search Report and Written Opinion issued in PCT Application PCT/US2022/020568, dated Jun. 27, 2022 (11 pages).

* cited by examiner

CSTK _ BSW2 (in)

APPARATUS AND METHOD FOR CHARACTERIZING LINER AND ANNULUS PROPERTIES WITH A GAMMA-GAMMA TOOL

CROSS-REFERENCE TO RELATED APPLICATIONS

This Application is a National Stage Entry of International Application No. PCT/US2022/020568, filed Mar. 16, 2022, which claims priority to U.S. Provisional Patent Application Ser. No. 63/164,205, which was filed on Mar. 22, 2021. The entirety of which is incorporated herein.

FIELD OF THE DISCLOSURE

Aspects of the disclosure relate to gamma-gamma measurements used to characterize properties of downhole structures. More specifically, aspects of the disclosure relate to methods and apparatus that may be used to determine casing thickness, collar presence, slot presence, packer integrity, density of the material in the annulus and other features used in recovery of hydrocarbons from geological stratum.

BACKGROUND

Gamma-gamma measurements may be used in cased-hole environment to estimate formation density. In order to achieve correct results, completion properties should be known and a backscatter detector is commonly used to assess apparent casing thickness. Casing collars are assessed during such investigations. Conventionally, short and long-spacing detectors are then used in combination to estimate formation density, assuming the cement density is known and constant. Cement evaluation through Gamma-Gamma measurements has also been independently addressed by conventional technologies.

The estimation of borehole diameter via a single long spacing detector, and directly using correlation between counting rates and hole diameter for controlled annulus and formation properties are also conventionally known.

While the conventional methods and apparatus described above are helpful in determining specific instances and features, there is a need to provide an apparatus and method that are easier to operate than conventional apparatus and methods.

There is a further need to provide apparatus and methods that do not have the drawbacks of these conventional systems, such as being cumbersome to calculate desired features, while providing a more accurate methodology to achieve better results than are possible with conventional technologies.

There is a still further need to reduce economic costs associated with operations and apparatus described above with conventional tools such that operators may more efficiently characterize needed information.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method of characterizing at least one downhole feature is disclosed. The method may comprise using a gamma-gamma tool, performing at least one scan to characterize casing properties and an annulus density indicator and correcting apparent densities from casing and annulus density effect.

In another example embodiment, a method is disclosed. The method may comprise producing at least one pulse of energy from a downhole tool, the at least one pulse of energy directed into a casing and annulus of a wellbore. The method may further comprise receiving the at least one pulse of energy at the downhole tool. The method may also comprise characterizing casing properties and an annulus density indicator from the received pulse of energy. The method may also comprise correcting apparent densities from casing and annulus density effect.

In another example embodiment, an apparatus is disclosed. The apparatus may be comprised of a downhole tool configured to transmit and receive gamma radiation into a casing and surrounding annulus of a wellbore, the downhole tool having at least three detectors to receive the gamma radiation. The apparatus may further be comprised of a computing apparatus configured to receive data from the downhole tool, wherein the computing apparatus is configured to perform a correction of data received based upon a combination of a first shallow measurement and a second deeper measurement.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1:
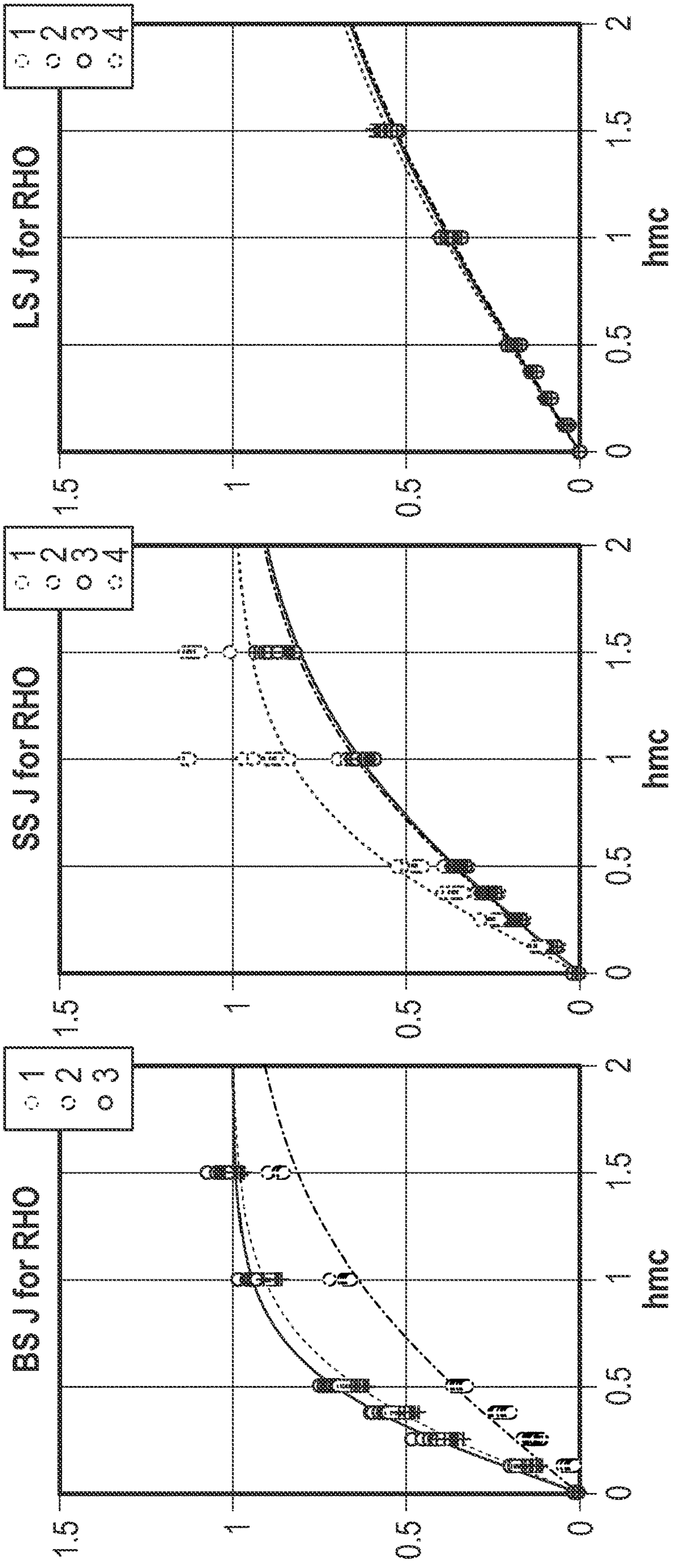
FIG. 1 is an example of different depths of investigation between different detectors and energy windows.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure relate to apparatus and methods for characterizing liner and annulus properties. Such characterization may be done through use of a gamma-gamma tool. In such tools, the transport of gamma ray radiation from a source to a detector in an energy range below 1 MeV is dominated by two types of interactions with the atoms: the scattering off the atom electrons and the photoelectric absorption. The cross sections of both interactions depend on the incident gamma ray energy, weakly for the scattering effect but strongly for the photoelectric effect. This latter effect dominates at low energy, below some 100 s keV or so for common atoms.

The gamma ray reaching a detector is stacked into an energy spectrum. Contiguous bins can also be grouped into so-called energy windows. The gamma-gamma tool used in aspects of the current disclosure may possess any number of detectors. In example embodiments provided herein, three (3) detectors are used. For clarity, the three detectors used are defined as Backscatter (BS), Short Spacing (SS), and Long Spacing (LS), and wherein 3 to 4 energy windows are produced per detector.

There is no exact formulation for the dependence of each energy window to formation electronic density and photoelectric factor. Common models use simple phenomenological formulations that combine an attenuation term from bulk gamma ray flux attenuation that decreases exponentially with the density and Pe and a scattering term proportional to electronic density. The parameters of these models depend on the detector and on the selected energy windows. Detectors that are located close to the source will have a larger contribution from the scattering term, as gamma rays need to scatter back to the tool while long-spaced detectors will have a dominant attenuation term.

In terms of depth of investigation, in addition to the effect of source-to-detector spacing, there is an additional effect linked to the energy window. High energy windows tend to have a shallower depth of investigation ("DOI") than low energy windows, as high energy gamma ray reaching the detector can only have endured a limited number of scattering and hence could not travel far.

Because the photoelectric factor has a depressing action on low energy windows, removing part of the gamma rays that could have been detected, the DOI of the photoelectric factor is somehow shallower than that of density, and does not depend on spacing in the "attenuation" transport regime.

This difference in depth of investigation between energy windows is implicitly accounted for in processing workflows based on algorithmic inversion of a forward model, when the forward model is defined on a database with radial information (for example mudcakes of different thicknesses).

An example of difference in DOI between different detectors and energy windows is provided in FIG. 1, for a specific choice of model. For this realization, the U is first provided as a result of the inversion of all the available energy windows at the same time, while the apparent density is inverted per energy window, with the fixed U. Differences of apparent DOI are visible for shallower BS and SS detectors. The interpretation of the density radial function may be taken with care as U effect is not fully separated. But they are indicative.

Aspects of the current disclosure characterize a cased-hole completion using the difference in radial sensitivity of different energy windows and detectors. Aspects of the disclosure provide the following new features:

1. Casing absorption indicator, identifying presence of slots, collars, packer.
2. Annulus density indicator, tracking the variations of the annulus density.
3. Classification Flag integrating information from casing absorption and annulus density indicators.
4. Annulus thickness, estimating the distance between casing wall and formation.

Figure 2:
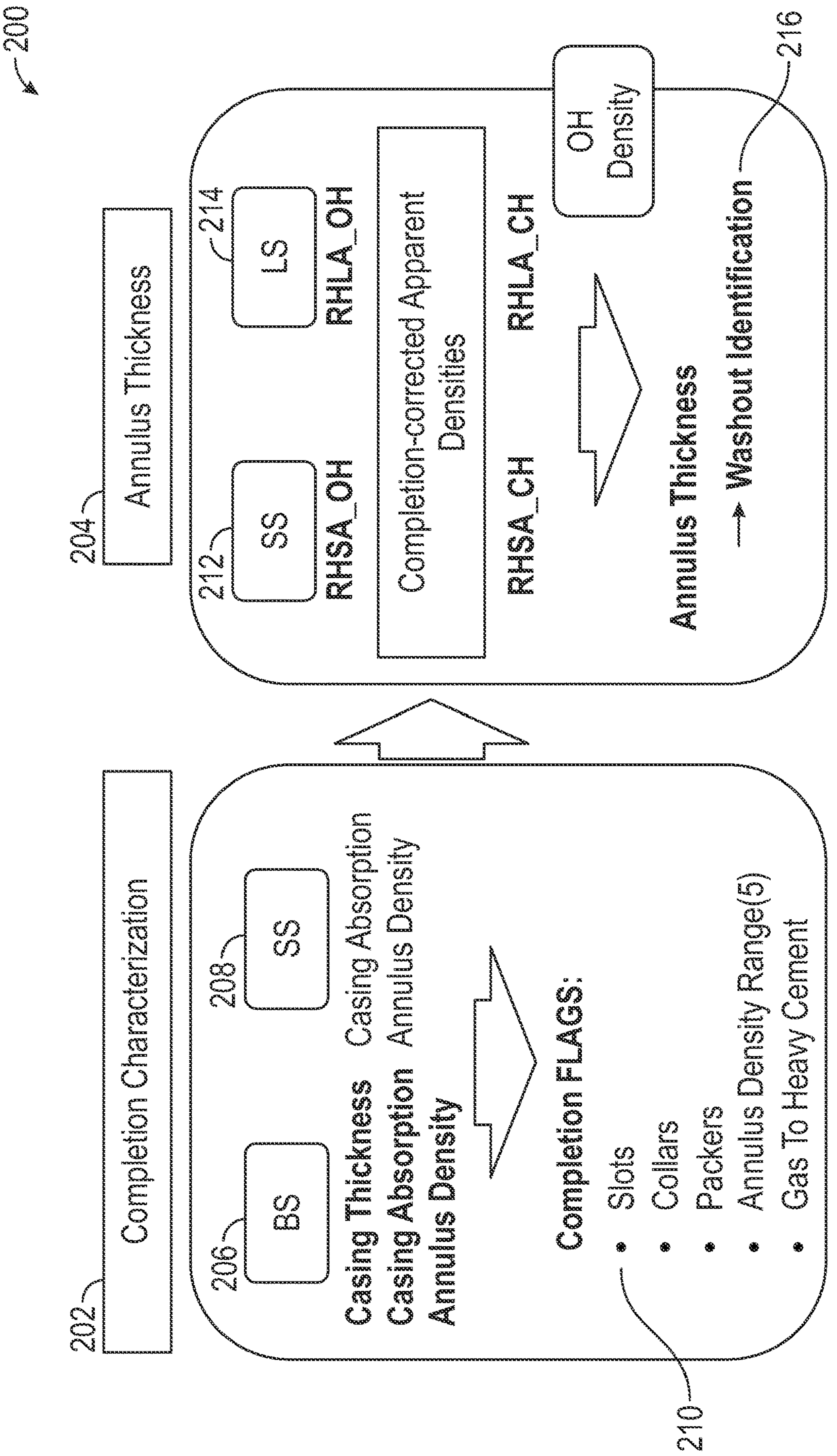
FIG. 2 is an example workflow to characterize production liner and annulus properties.

FIG. 2 shows an illustration of the workflow 200. An inversion analysis follows a workflow that can be performed in 2 steps:

1. Step 1: characterize casing properties at 202 and annulus density indicator 208. Create a classification flag for easy tracking at 210.
2. Step 2: correct apparent SS at 212 and LS densities at 214 from casing and annulus density effect, assuming nominal annulus thickness. Combine SS and LS corrected densities with OH density and estimate annulus thickness at 216.

Step 1 is further defined, in one example embodiment, below:

BS energy windows show different DOI. The 50%-DOI is typically within the 0.3-0.7-in range (for OH-measurements). When casing is present, the shallower measurements are mostly sensitive to the casing, with some residual sensitivity to annulus properties. The measurement with deeper DOI will be more sensitive to the annulus and possibly formation properties and by combining the different energy windows, we can extract information related to casing and annulus properties.

Figure 3:
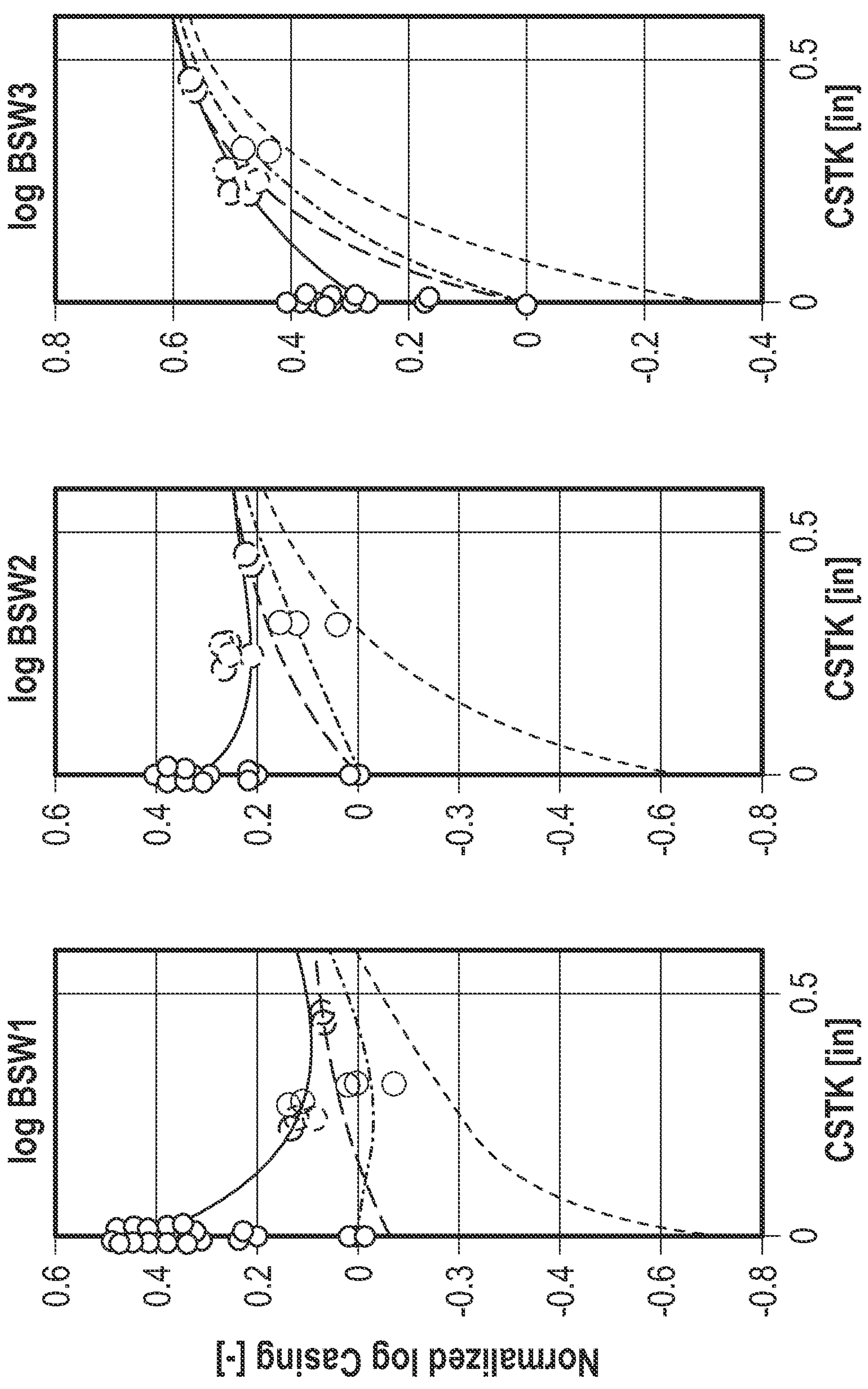
FIG. 3 is series of casing thickness estimators from different energy windows of a single back scatter detector.

For that purpose, an apparent casing thickness for each energy window of the BS detector is estimated. FIG. 3 presents the variation of the logarithm of the BS counts for each energy window as a function of casing thickness, for varying formation density but fixed annulus density. These data come from real measurements in controlled conditions. The different reduced sensitivity to formation properties for higher energy windows may be observed. A clear casing photoelectric effect may also be observed for the lower energy windows, with a strong suppression of counts as soon as some casing is present that is only compensated by backscattering effect at larger casing thickness.

The red lines correspond to an example of apparent thickness estimator. It is clear that depending on the true casing thickness, the apparent casing thickness can be strongly overestimated for the low energy windows, with a sensitivity to both annulus and formation properties. The general use of this type of direct estimator can be misleading, but in controlled conditions, with little variation around a "nominal" point, they bring forward useful pieces of information.

In embodiments, a fit-for-conditions solution is used, optimizing the workflow around expected operational conditions. A different objective may be targeted, which is the characterization of completion (casing and annulus), and not characterization of the formation itself.

In the following, it is assumed, for illustration, that the workflow is optimized for a 7-in casing or line, with possibly varying annulus densities, inside a 8.75-in borehole. It is assumed that the open hole formation density is known, or at least have some correlated indicator, that is defined as HDEN.

The first step is to remove the contribution from the formation to the apparent casing thickness estimated described in FIG. 2. A simple linear correction can be implemented, as long as conditions remain close to nominal conditions, as shown in FIG. 3, where the counts for a BS energy window (window 2, log scale) are plotted against formation density in a real log example.

Once the residual formation density effects are removed from the counting rates, a casing estimator can be computed. They are now functions of true casing thickness and annulus density. An example of equation that can be used to correlate the counting rates in a given energy window of a backscatter measurement is as follows:

$$CSTK_{BSW} = \alpha \log(\beta \log(BSW) + \gamma) \quad \text{EQ1}$$

Figure 4:
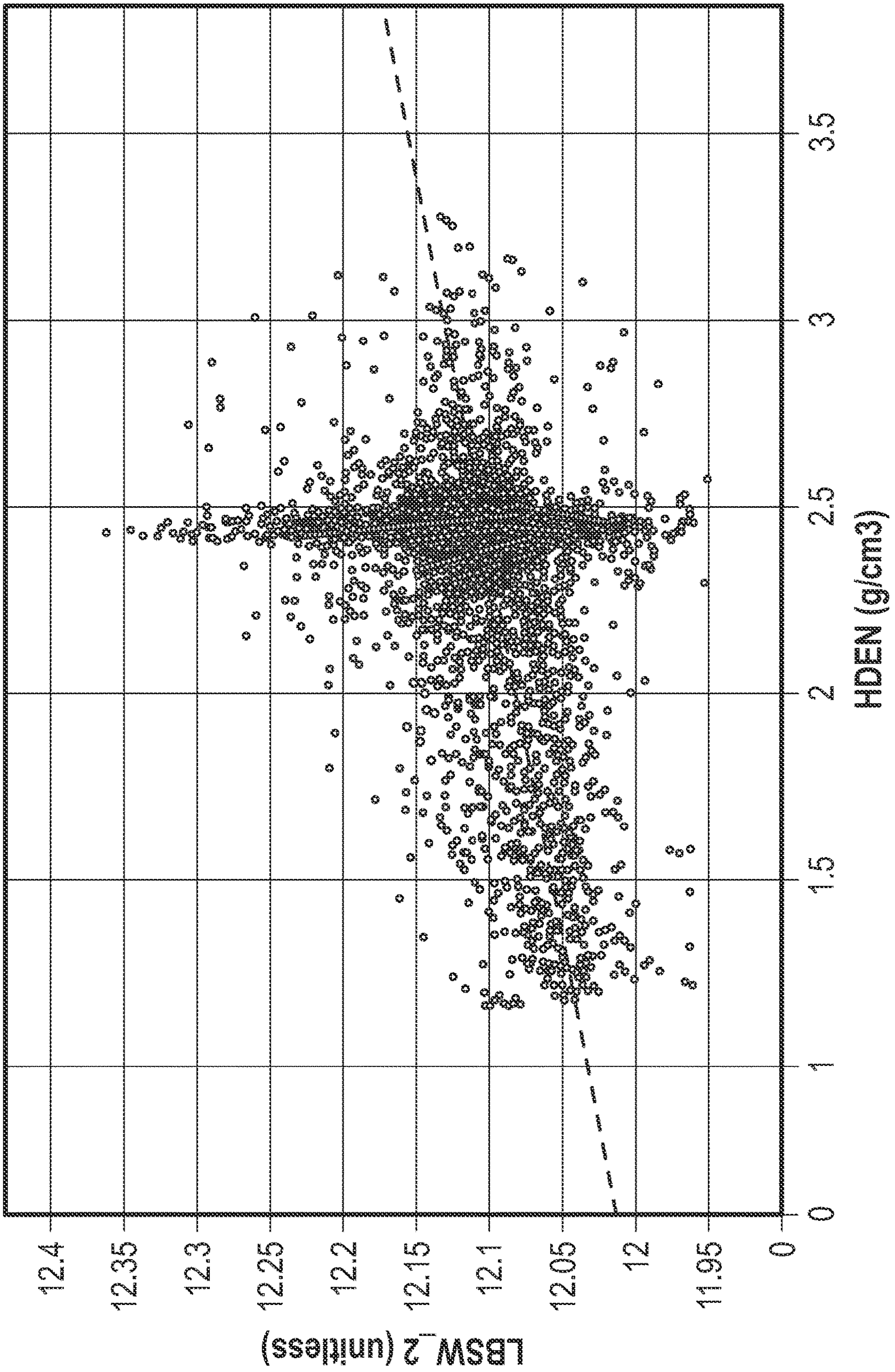
FIG. 4 is an example of removal of residual formation density effects on back scatter energy windows.

FIG. 4 shows a cross plot of window 2 and window 3 casing thickness estimators in a real log example. The black points correspond to intervals with collar joints, where the actual casing thickness increases. The yellow points correspond to intervals with slots in the casing, where the actual casing thickness is nil. We can decompose this cross plot into two principal axes: a casing absorption axis along the red line and a second axis represented by the blue line where annulus properties are varying, from low density to the left to higher density to the right.

The projection onto the casing absorption axis following the annulus density axis constitutes a measurement called casing absorption. It is zeroed at expected nominal casing absorption point to provide an index that varies around zero.

The projection onto the annulus density axis following the casing absorption axis constitutes a measurement called annulus density, which is scaled to represent density variations from a gas density to a high cement density.

The same process is applied to short spacing detector to obtain two complementary estimations that may be used for quality control, as short spacing is less sensitive to casing and annulus properties than back scatter.

Figure 5:
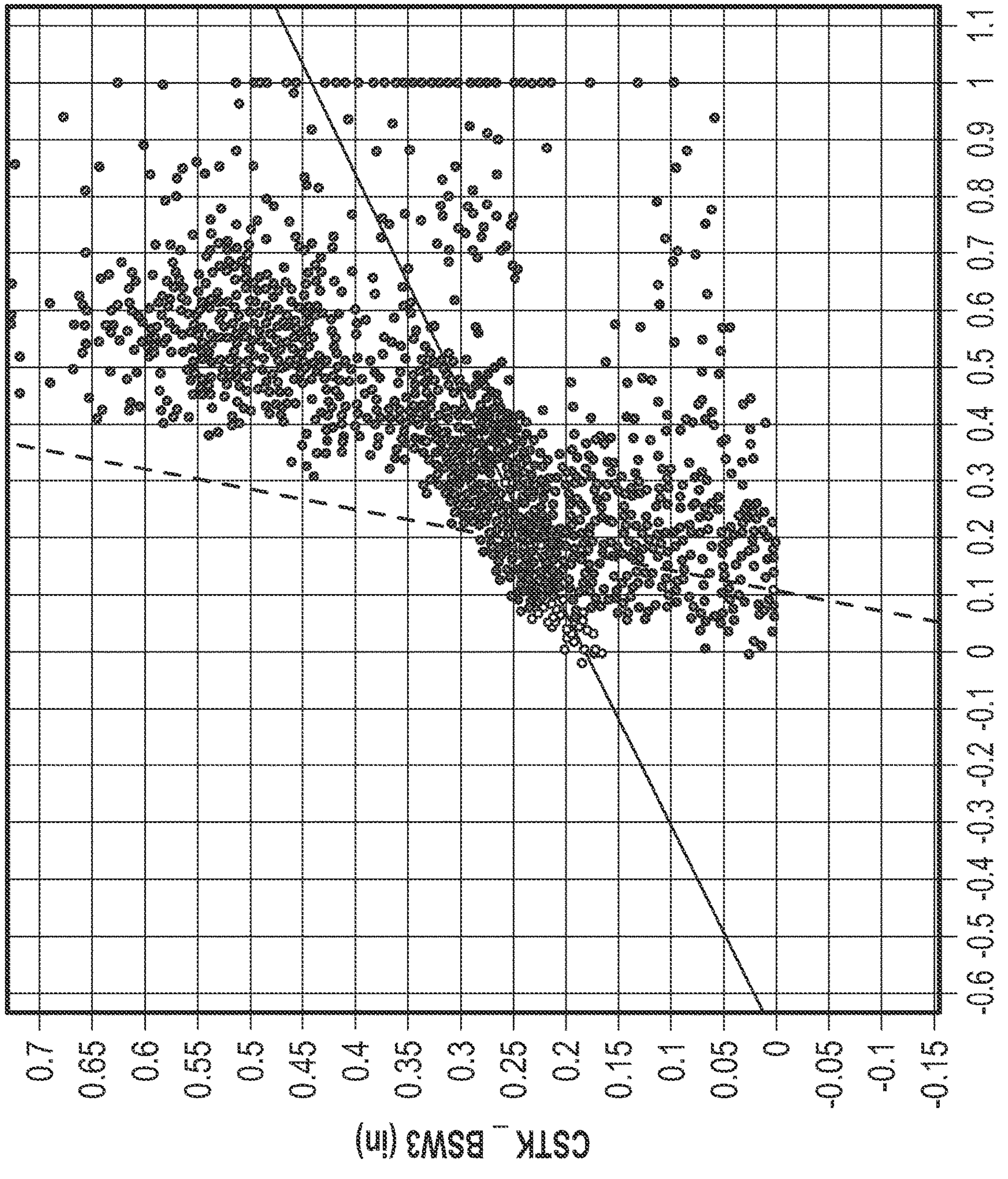
FIG. 5 is a graph of apparent casing thickness estimators and decomposition into casing absorption axis and annulus density axis.

Resulting indicators of casing absorption and annulus density are shown in FIG. 5. The low spikes in casing absorption in tracks 2 and 3 indicate the presence of slots in the liner. The casing absorption from BS is more robust than that of SS. However, it can show some limitation due to the narrow azimuthal coverage of the measurement. In one interval, backscatter is not showing slots while short spacing is. This difference is related to the difference in azimuthal sensitivity, the back scatter has a narrowed azimuthal aperture than short spacing. In this case, the tool is not facing directly the slots. This interval highlights the added value of having both BS and SS indicators. The two annulus density curves are displayed in track 4. Residual collar effects may be observed due to imperfect projection. In the top of the upper slotted liner, a sharp drop may be observed in the annulus density: it clearly indicates the presence of light fluid behind the liner, which in this case is production gas trapped below the packer.

Figure 6:
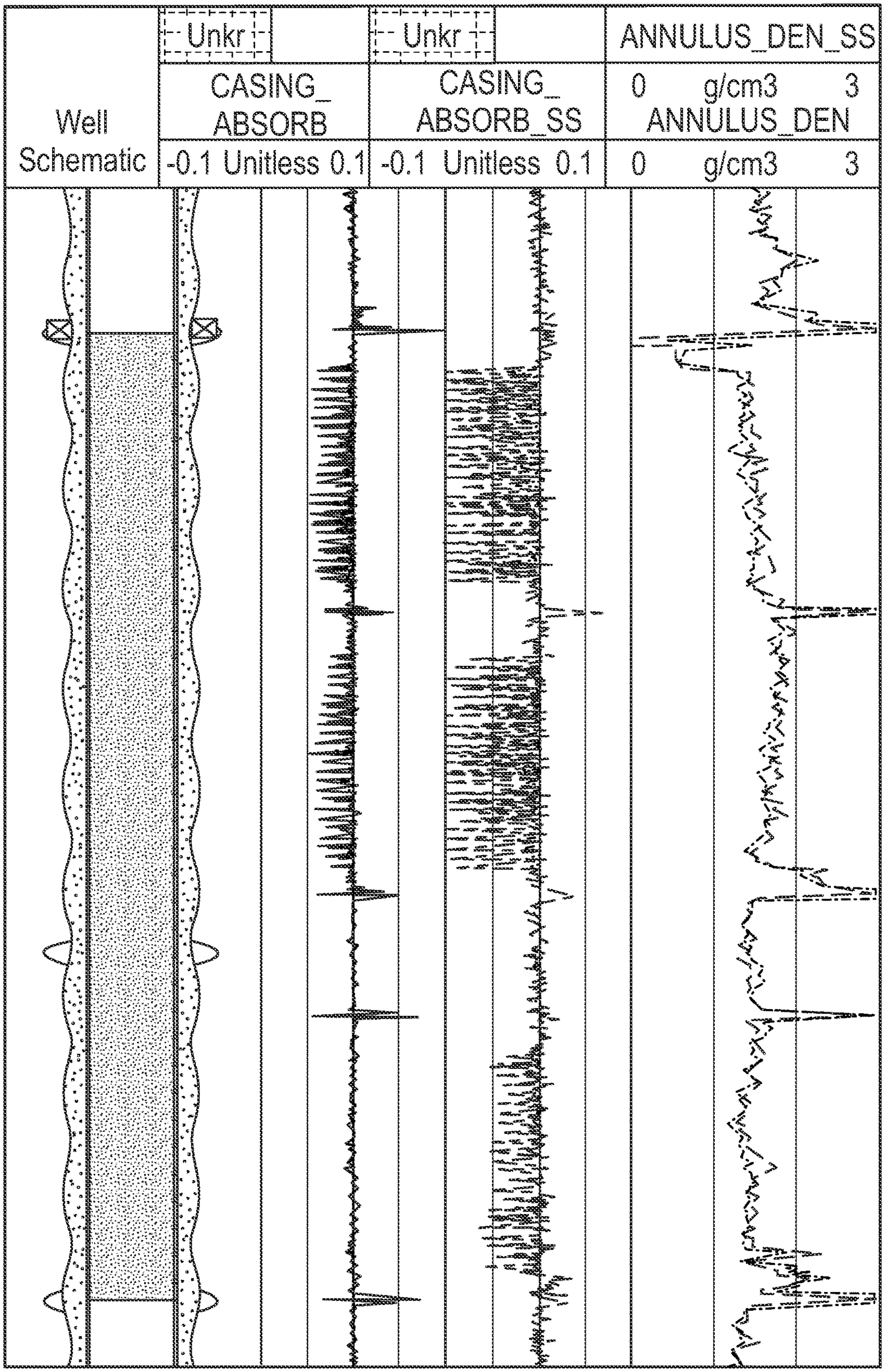
FIG. 6 is an example of different casing absorption and annulus density indicators.
Figure 7:
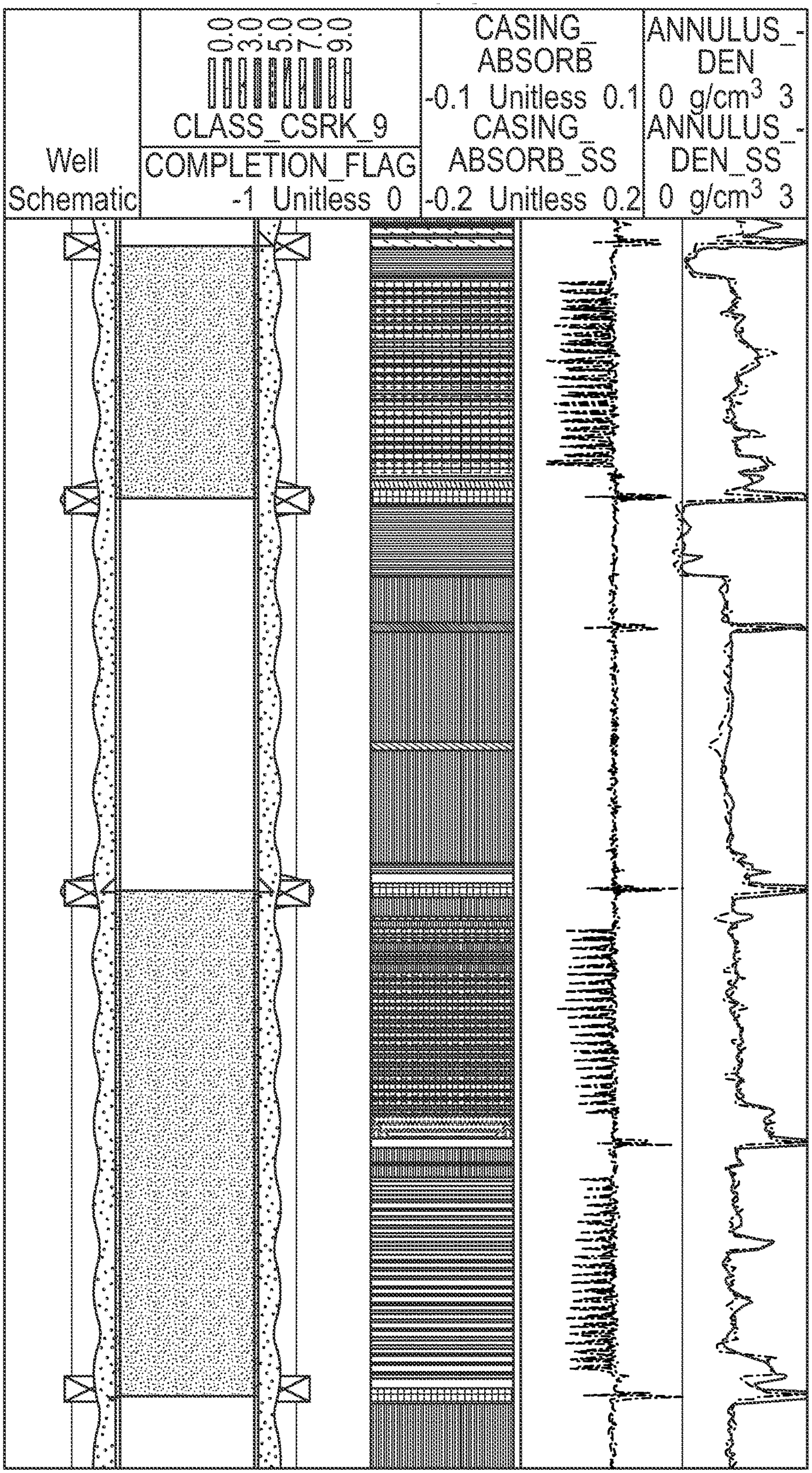
FIG. 7 is an example of completion classification in one example embodiment of the disclosure.

A classification flag, see 210, is created based on casing absorption and annulus density indicators. It classifies different depth intervals with the following labels (given as illustration, but not restricted to):

0: gas in annulus
1: light fluid in annulus
2: water in annulus
3: cement in annulus
4: heavy cement in annulus
5: liner slot
6: casing collar
7: casing de-centralizer
8: packer An example of classification flag is shown in FIG. 6.

Figure 8:
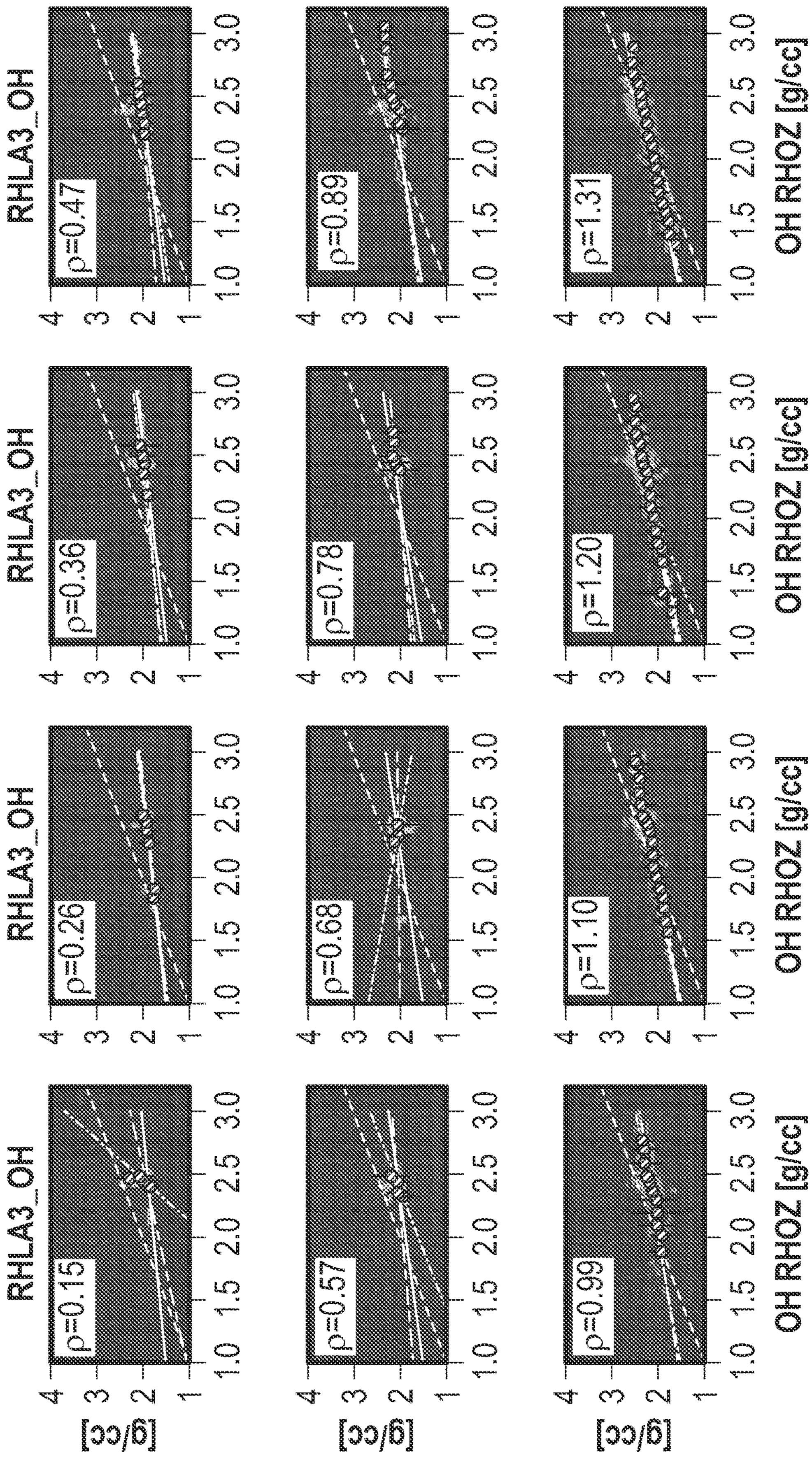
FIG. 8 is a series of graphs of open-hole equivalent apparent densities for a combination of long spacing energy windows and varying annulus properties.
Figure 8:
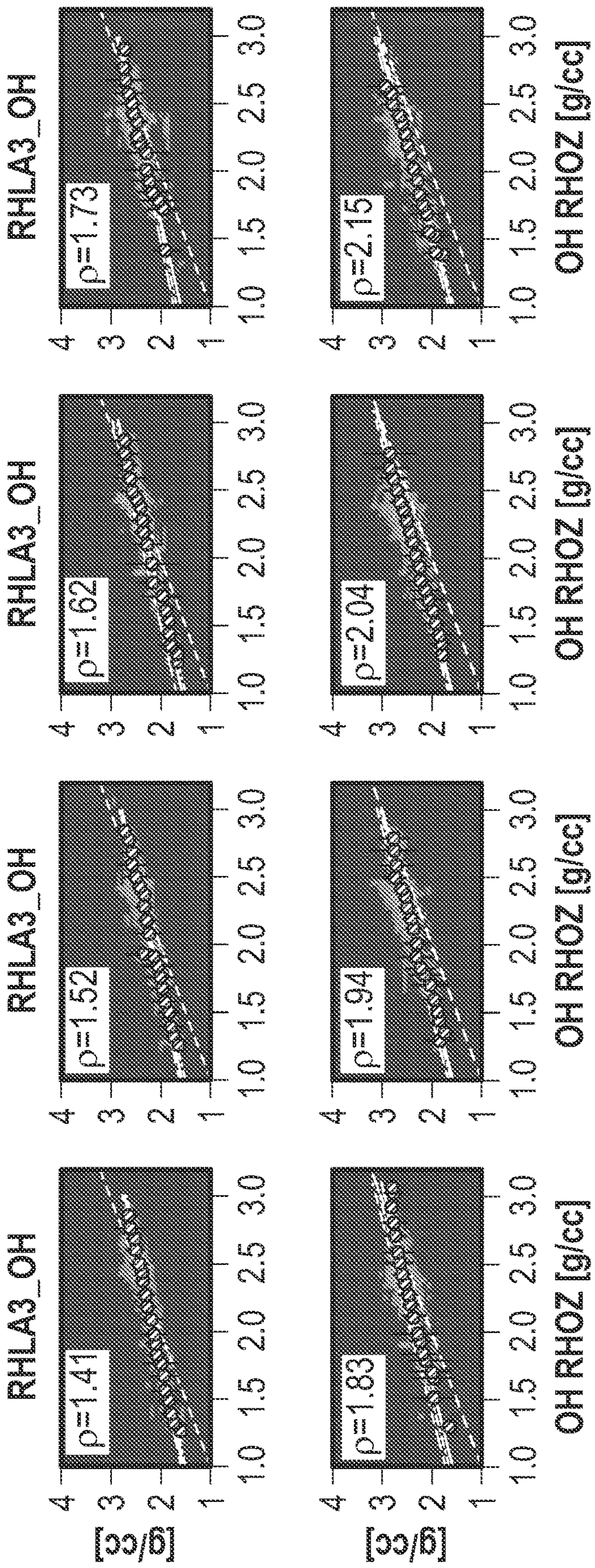

Step 2:

Using an open-hole database, and following existing methods, apparent monosensor densities can be derived from SS and LS in all conditions, including cased hole conditions. Of course, in the latter conditions, these apparent densities are affected by the presence of casing and annulus, and not only by formation properties. FIG. 8 shows an example of variation of an apparent density from a combination of LS energy windows as function of open hole density, for different and increasing values of annulus density indicators.

Figure 9:
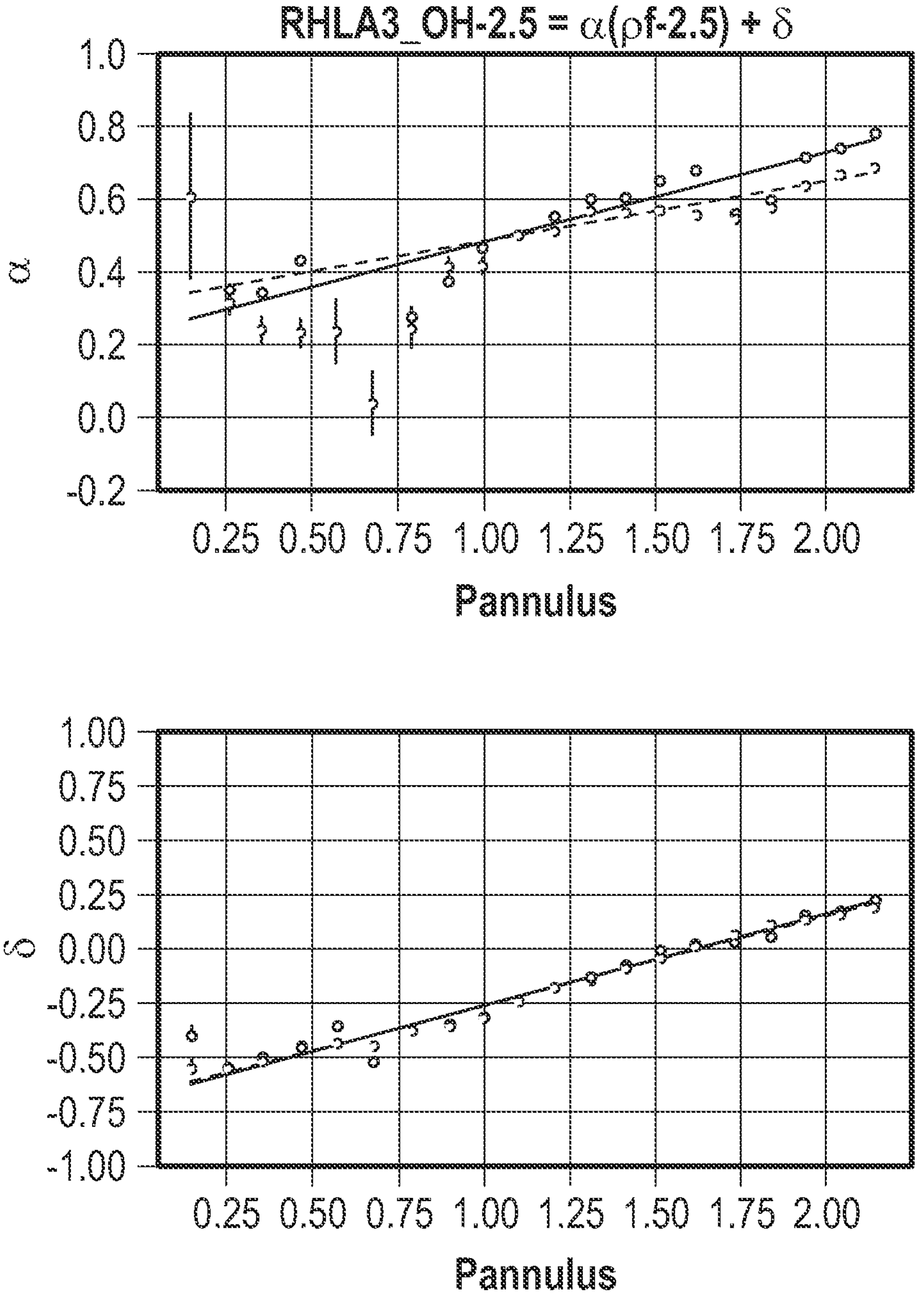
FIG. 9 is a linear fit of a cased-hole calibration coefficients as a function of annulus density.
Figure 10:
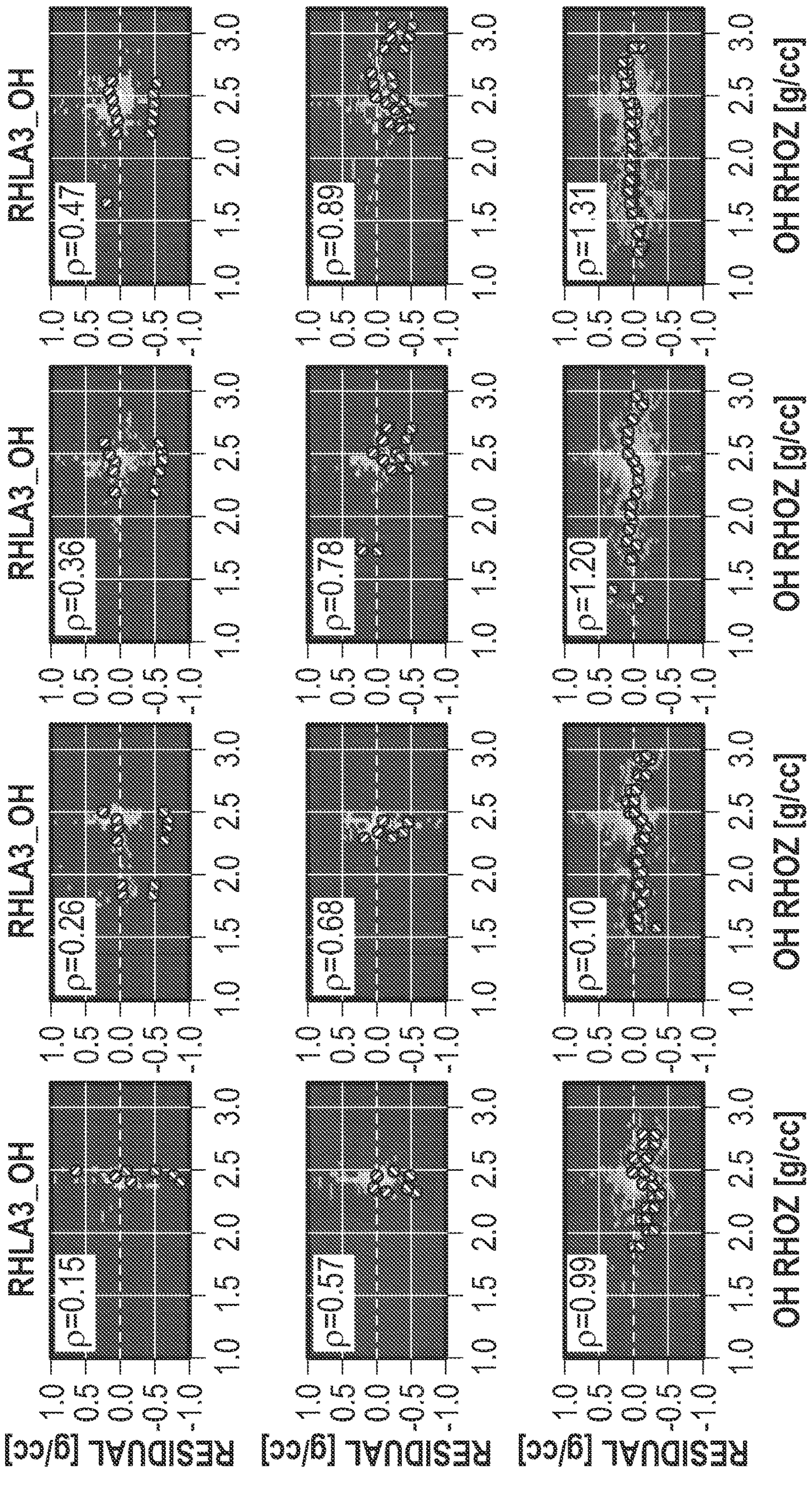
FIG. 10 is a series of graphs of residual errors of formation density estimates from combination of long spacing energy windows as a function of annulus density.
Figure 10:
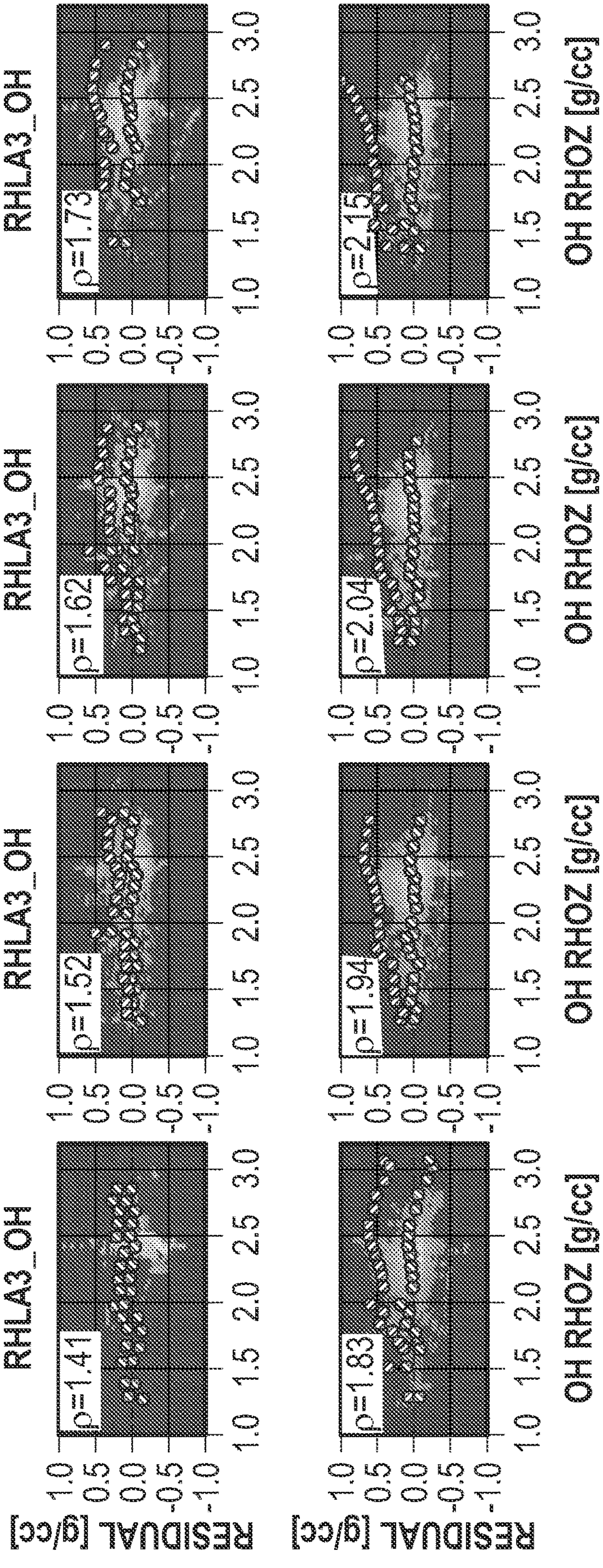

Once the casing properties and the annulus density indicator are estimated in step 1, it is possible to correct the apparent SS and LS densities from the effect of casing and from the effect of an annulus of varying density, according to the previously derived annulus density indicator curves, but of "nominal" thickness. This correction can be calibrated on MCNP simulation and on log data where OH reference density is known. Example of linear calibration is given in FIG. 9 and an example of the resulting calibrated densities is shown FIG. 10.

For each detector, a combination of apparent single energy window densities is created to optimize the robustness of the answer. This combination results in a single corrected apparent density for each detector, namely RHSA_CH and RHLA_CH.

These CH apparent densities (RHSA_CH or RHLA_CH) should overlap with the OH formation density (DEN_OH), provided the annulus thickness is nominal. Deviations from nominal annulus thickness can be parameterized by a radial response factor J_RHXA defined as:

$$J\_RHXA = \frac{DEN\_OH - RHXA\_CH}{2.5 - ANN\_DEN} \quad \text{EQ. 2}$$

This expression is similar to that of the radial response function J defined in the introduction, with the exception that the formation density is replaced by fixed 2.5 g/cc in the denominator. This substitution aims at stabilizing $J_{CH}$ in front of low-density coal layers.

Figure 11:
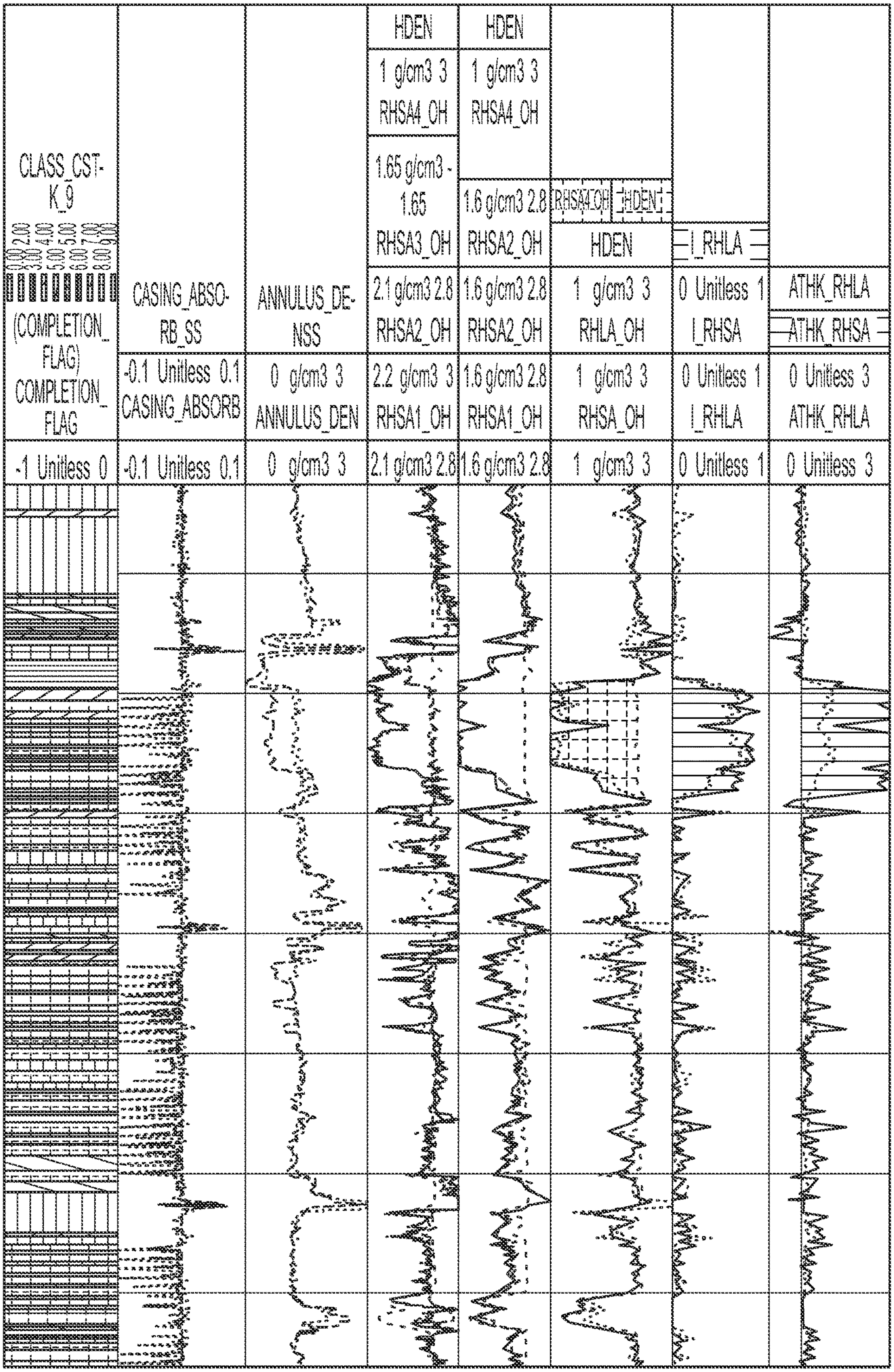
FIG. 11 is a series of graphs of cased hole tool responses.

The quantification of actual annulus thickness relies on a transform of J_RHXA into thickness excess to which is added the nominal annulus thickness to provide ATHK_RHXA, as illustrated in FIG. 11. On possible such transform can be written as follows:

$$ATHK\_RHXA = ATHK\_NOM + \alpha(ANN\_DEN) \times \operatorname{atan}(J\_RHXA), \quad \text{EQ. 3}$$

Where ATHK_NOM is the monila annulus thickness, and α(ANN_DEN) is a function fitted on a MCNP or controlled log database. Resulting logs are illustrated in FIG. 11.

In the presence of casing and annulus, the sensitivity of the different energy windows to formation properties is significantly affected. In particular, the shallow BS measurements quickly lose their sensitivity to formation properties. FIG. 3 presents the variations of the logarithm of count rates per energy window, normalized to a water tank measurement, as a function of the casing thickness (CSTK ranging from 0.23 in to 0.45 in) for a series of EECF cased-hole measurements. The red, blue, and brown lines illustrate the effects of gas, water, and cement behind the casing (assuming no formation effect). They are obtained after using the open hole tool response coupled with a model of the variation of apparent density and PE as a function of casing thickness. The effect of casing on PE absorption is significant on the low-energy window BSW1. An increase of casing thickness first depresses the counts, and only at large casing thickness does the backscattering effect start to dominate, increasing counts. The effect is less pronounced for BSW2 and even less for BSW3.

To capture the sensitivity of the different BS energy windows to completion properties, transforms are defined between counting rates and apparent casing thickness; these are represented by the black lines in FIG. 3. These are designed such that they would provide a correct casing thickness in front of cemented casing, of thickness larger than approximately 0.3 in, but extrapolate to a casing thickness of 0-in in a water tank. The rationale behind this hybrid design is to maintain physical insight in front of both well-cemented liners and in front of liner slots, where there is no casing but only water. Using these transforms, a crossplot is derived between apparent casing thickness from BSW2, called CSTK_ME, and from BSW3, called CSTK_SH, as shown in FIG. 12.

Figure 12:
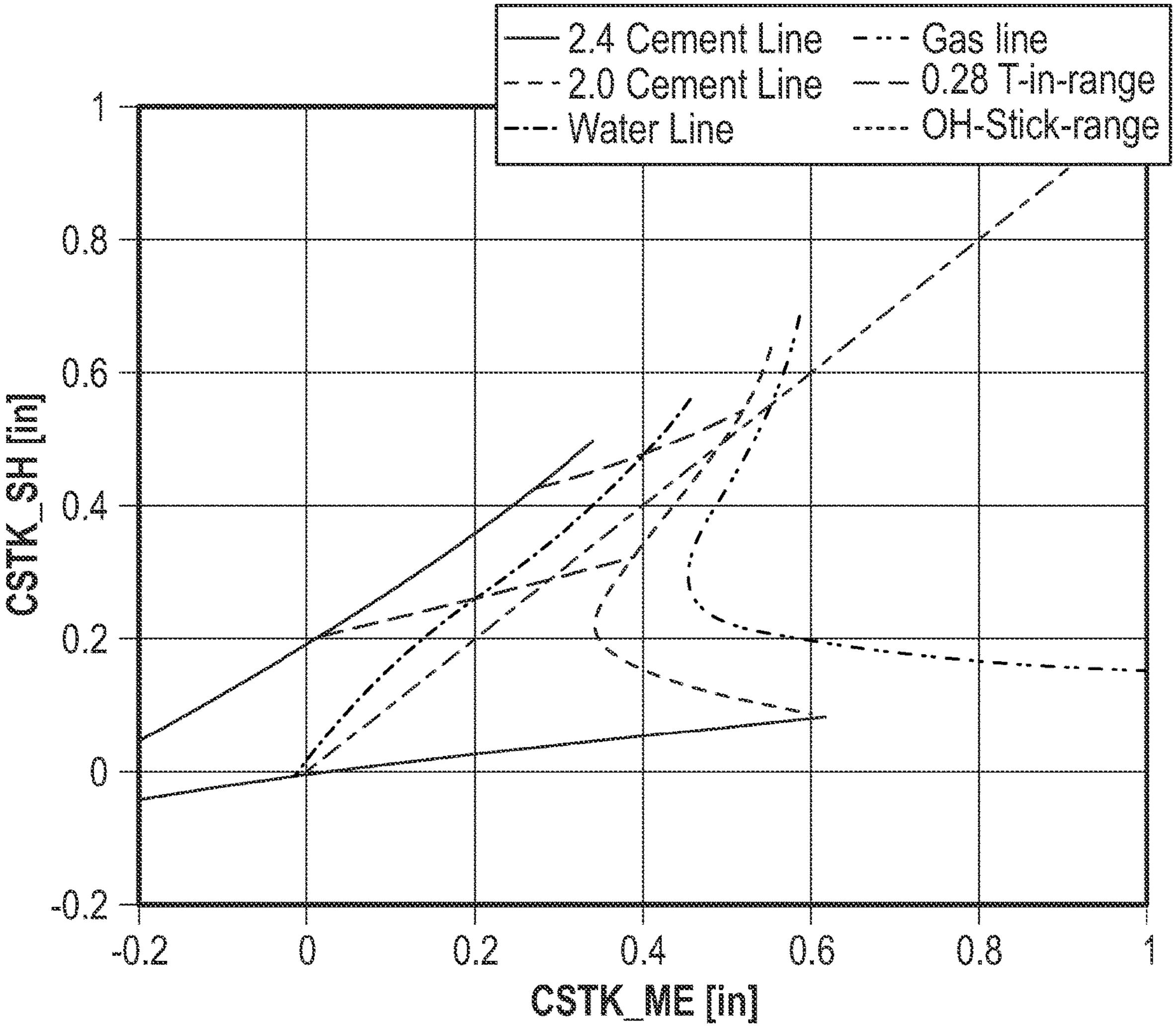
FIG. 12 is a cross-plot of apparent casing thicknesses.
Figure 13:
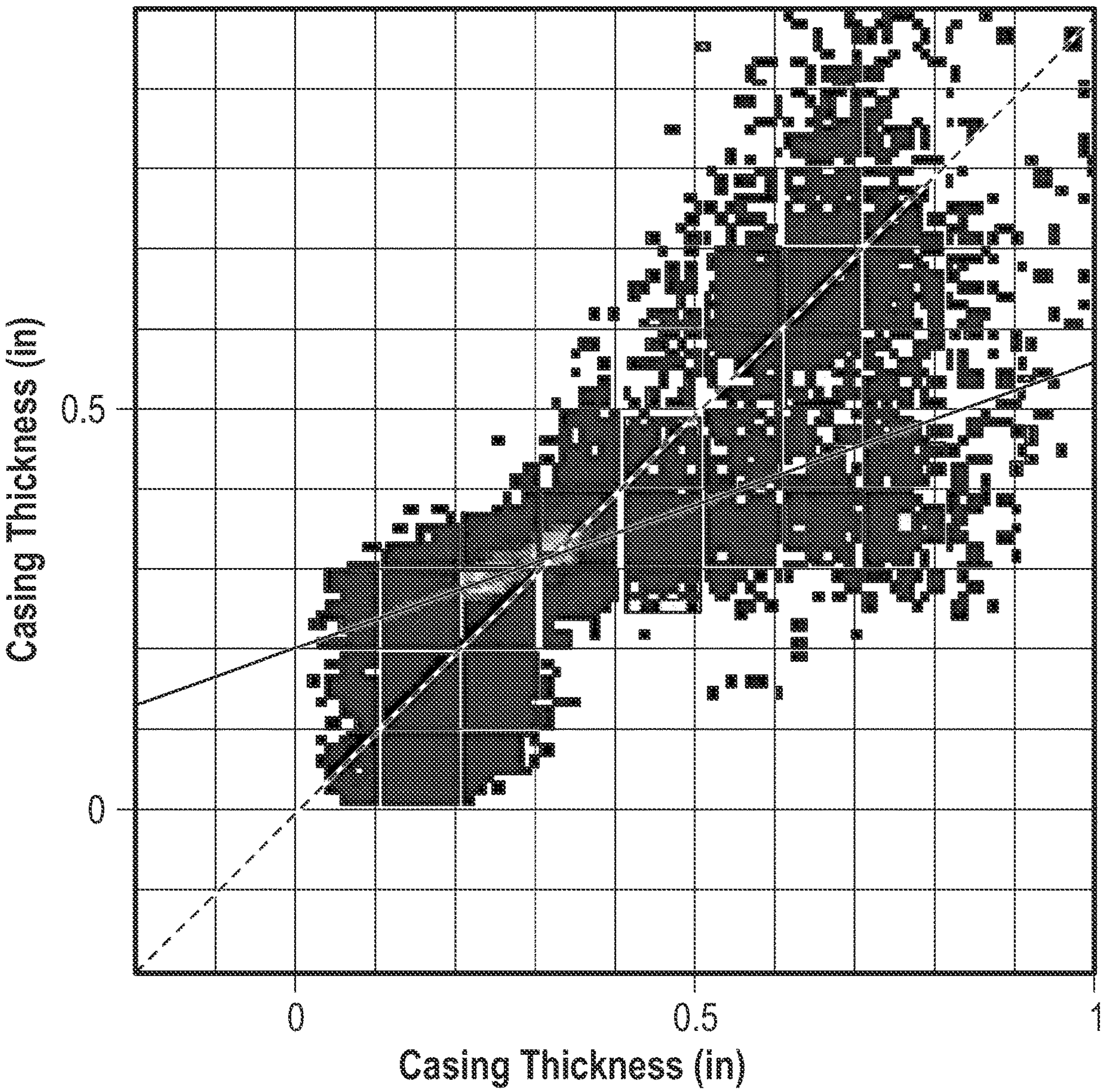
FIG. 13 is a cross-plot of apparent casing thicknesses.

In FIG. 12, the pink line represents the approximate 0.317 in liner case, which is the typical casing thickness used in these well completions. For comparison, FIG. 13 presents the apparent casing thicknesses CSTK_SH vs CSTK_ME on a series of field trials. The agreement between the simple model and the real data is good. As illustrated, with the main pink line, where most of the data are concentrated, there are two main density peaks, corresponding to cemented and uncemented liner sections. It is also illustrated showing the presence of a slotted liner, where CSTK_SH decreases significantly while CSTK_ME may remain constant or even increase depending on annulus density. Finally, we recognize a contribution of high casing thickness for both measurements, corresponding to the presence of casing collars.

This method may be used to separate and quantify the effects of annulus density and casing thickness. The uncertainty associated with this method, however, was considered unacceptably high due to the scarcity of the cased-hole database and the absence of numerical (MCNP®) modeling to support the exact response. In one embodiment, a more robust analysis is presented. By projecting onto the pink, 0.317-in casing line along the water-annulus casing thickness axis, an indicator is obtained of annulus density, referred to as ANNULUS_DEN. In addition, by projecting on the casing thickness axis along the pink line direction, an estimation of casing thickness is obtained, from which we subtract the nominal casing thickness of 0.317 in to end up with an indicator called CASING_ABSORB.

In another embodiment, interpretation of residual variations as a function of annulus thickness and estimation of such is further provided. For that purpose, an approach based on the radial response function formalism as shown in Equation 4.

$$J(h_{mc}) = \frac{\rho_{form} - \rho_{apparent}(h_{mc})}{\rho_{form} - \rho_{mc}}, \quad (4)$$

In this embodiment, a density correction workflow is provided for a three-step preparatory analysis. First, the radial response function behind a 0.3-in casing must be evaluated; second, the effect on this response of varying annulus density must be accounted for; and last, the response must be zeroed around a nominal 0.875-in annulus thickness to follow the corrected density definition.

To address the first step, numerical simulation results are used that were obtained during the derivation of the density cased-hole algorithm. The annulus material is cement, cement thickness ranges from 0 to 2 in, and formation density ranges from 1.7 to 3.03 g/cc. The modeled response functions take the simple form of a hyperbolic tangent with a single coefficient λ, such that $$J(h_a) = \tanh\left(\frac{h_a}{\lambda(CSTK)}\right). \quad \text{(EQ. 5)}$$

where $h_a$ is the annulus thickness, and λ is a function of the casing thickness CSTK. For each casing thickness, a specific transform calibrated for the no-cement case allows accounting for pure casing effect and hence estimating the residual radial response to cement thickness. For energy window 3 from the short and long spacing detectors, we obtain the results listed in Table 1.

TABLE 1

Radial function coefficients behind casing.

| λ [in] | Short Spacing | Long Spacing |
|---|---|---|
| Openhole | 1.16 | 2.6 |
| CSTK = 0.3 in | 0.9 | 2.5 |

At this stage, there is no estimate of the effect of varying annulus density on the radial response function, so we will use the cement-type response and acknowledge that the annulus thickness estimation is not fully quantitative but instead captures its qualitative dynamic range.

Using Equation 5, for the casing-only-corrected density $\rho_{cas}$, $$\rho_{cas}=\rho_f+J(h_a)(\rho_a-\rho_f) \quad \text{(EQ. 6)}$$

The casing and nominal cement thickness corrected density $\rho_{CH}$ becomes $$\rho_{CH} = \rho_f + \frac{J(h_a) - J_0}{1 - J_0}(\rho_a - \rho_f), \quad \text{(EQ. 7)}$$

where $J_0=J(h_o)$ with $h_0$ the nominal thickness. By using a Taylor expansion around the nominal thickness, the change in annulus thickness radius may be estimated through $$h_a \simeq h_0 + C\cdot\frac{\rho_f - \rho_{CH}}{\rho_f - \rho_a}, \quad \text{(EQ. 8)}$$

where $$C = \frac{\lambda(1 - J_0)}{J_0'} \text{ and } J_0' = \operatorname{sech}^2\left(\frac{h_0}{\lambda}\right).$$

For short spacing and long spacing measurements, using the values listed in Table 1 for 0.3 in casing and cement, the geometrical terms have values $C_{SS3}$=0.52 and $C_{LS3}$=1.78. While it is understood that these values are indicative only, they still serve as guidance for the actual implementation. The annulus thickness obtained from the long spacing detector is called ATHK_RHLA in the following section.

In front of coal layers, the formation density $\rho_f$ can be as low as or even lower than the annulus density, and the computation proposed in Equation 7 may become inaccurate. To avoid presenting confusing results in such cases, the computation is limited to noncoal intervals. Similarly, intervals classified as collar or packer are excluded from the computation.

In one example embodiment, a method of characterizing at least one downhole feature is disclosed. The method may comprise using a gamma-gamma tool, performing at least one scan to characterize casing properties and an annulus density indicator and correcting apparent densities from casing and annulus density effect.

In another example embodiment, the method may be performed wherein the correcting apparent densities include correcting an apparent short-spaced density and long-spaced density.

In another example embodiment, the method may be performed wherein the correcting apparent densities further comprise assuming a nominal annulus thickness.

In another example embodiment, the method may be performed wherein the correcting apparent densities include estimating an annulus thickness from combining short spaced and long spaced densities with a OH density.

In another example embodiment, the method may be performed wherein the performing the at least one scan includes creating a classification flag.

In another example embodiment, the method may be performed wherein the creating the classification flag includes at least one of the following: water in the annulus, cement in the annulus, heavy cement in the annulus, presence of a liner slot.

In another example embodiment, the method may be performed wherein the classification flag includes at least one of the following: a casing collar, a casing de-centralizer and a packer.

In another example embodiment, a method is disclosed. The method may comprise producing at least one pulse of energy from a downhole tool, the at least one pulse of energy directed into a casing and annulus of a wellbore. The method may further comprise receiving the at least one pulse of energy at the downhole tool. The method may also comprise characterizing casing properties and an annulus density indicator from the received pulse of energy. The method may also comprise correcting apparent densities from casing and annulus density effect.

In another example embodiment, the method may be performed wherein the correcting apparent densities include correcting apparent short-spaced densities.

In another example embodiment, the method may be performed wherein the correcting apparent densities include correcting apparent long-spaced densities.

In another example embodiment, the method may be performed wherein the downhole tool produces gamma radiation.

In another example embodiment, the method may be performed wherein the downhole tool has three detectors.

In another example embodiment, the method may be performed wherein the characterizing casing properties and an annulus density indicator from the received pulse of energy further comprise creating a classification flag.

In another example embodiment, the method may be performed wherein the creating the classification flag includes at least one of the following: water in the annulus, cement in the annulus, heavy cement in the annulus, presence of a liner slot.

In another example embodiment, the method may be performed wherein the classification flag includes at least one of the following: a casing collar, a casing de-centralizer and a packer.

In another example embodiment, an apparatus is disclosed. The apparatus may be comprised of a downhole tool configured to transmit and receive gamma radiation into a casing and surrounding annulus of a wellbore, the downhole tool having at least three detectors to receive the gamma radiation. The apparatus may further be comprised of a computing apparatus configured to receive data from the downhole tool, wherein the computing apparatus is configured to perform a correction of data received based upon a combination of a first shallow measurement a second deeper measurement.

In another example embodiment, the apparatus may be comprised wherein the downhole tool is configured to transmit energy in an energy range below 1 MeV.

In another example embodiment, the apparatus may be comprised wherein the computing apparatus and the downhole tool are connected through a wire.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method, comprising:

producing gamma ray radiation from a downhole tool, the gamma ray radiation directed into a casing and an annulus between the casing and a wellbore wall of a wellbore;

receiving the gamma ray radiation at the downhole tool at a backscatter (BS) detector, a short spacing (SS) detector, and a long spacing (LS) detector, resulting in measured energy;

producing, for the measured energy, a plurality of BS energy windows for the BS detector, a plurality of SS energy windows for the SS detector, and a plurality of LS energy windows for the LS detector;

using at least two of the plurality of BS energy windows, characterizing casing properties of the casing, the casing properties including a BS casing thickness;

using the at least two of the plurality of BS energy windows, characterizing an annulus density indicator of the annulus;

using a pre-determined database of open hole conditions and the measured energy, identifying apparent densities of the annulus for the SS detector and the LS detector; and using the casing properties of the casing and the annulus density indicator, applying a correction to the apparent densities, resulting in a corrected annulus density.

2. The method according to claim 1, wherein applying the correction includes applying the correction to correct apparent short-spaced densities.

3. The method according to claim 1, wherein applying the correction includes applying the correction to correct apparent long-spaced densities.

4. The method according to claim 1, further comprising creating a completion classification flag using the casing properties and the annulus density indicator.

5. The method according to claim 4, wherein creating the completion classification flag includes creating the completion classification flag having at least one of water in the annulus, cement in the annulus, heavy cement in the annulus, or a presence of a liner slot.

6. The method according to claim 4, wherein creating the completion classification flag includes creating the completion classification flag having at least one of a casing collar, a casing de-centralizer, or a packer.

7. The method according to claim 1, further comprising identifying an annulus thickness of the annulus using the corrected annulus density.

8. The method according to claim 1, wherein identifying the apparent densities of the annulus for the SS detector includes identifying a plurality of SS apparent densities, each of the plurality of SS apparent densities associated with an associated SS energy window of the plurality of SS energy windows.

9. The method according to claim 1, wherein identifying the apparent densities of the annulus for the LS detector includes identifying a plurality of LS apparent densities, each of the plurality of LS apparent densities associated with an associated LS energy window of the plurality of SS energy windows.

10. An apparatus, comprising:

a downhole tool configured to transmit and receive gamma radiation into a casing and annulus between the casing and a wellbore wall of a wellbore, the downhole tool including a backscatter (BS) detector, a short spacing (SS) detector, and a long spacing (LS) detector to receive measured energy; and a computing apparatus configured to receive data from the downhole tool, wherein the computing apparatus includes a processor and memory, the memory including instructions that cause the processor to:

produce, for the measured energy, a plurality of BS energy windows for the BS detector, a plurality of SS energy windows for the SS detector, and a plurality of LS energy windows for the LS detector;

using at least two of the plurality of BS energy windows, characterize casing properties of the casing, the casing properties including a BS casing thickness;

using the at least two of the plurality of BS energy windows, characterize an annulus density indicator of the annulus;

using a pre-determined database of open hole conditions and the measured energy, identify apparent densities of the annulus for the SS detector and the LS detector; and using the casing properties of the casing and the annulus density indicator, apply a correction to the apparent densities, resulting in a corrected annulus density.

11. The apparatus according to claim 10, wherein the downhole tool is configured to transmit energy in an energy range below 1 MeV.

12. The apparatus according to claim 10, wherein the computing apparatus and the downhole tool are connected through a wire.

13. A non-transitory computer readable medium storing instructions that, when executed by a processor, cause the processor to:

produce gamma ray radiation from a downhole tool, the gamma ray radiation directed into a casing and an annulus between the casing and a wellbore wall of a wellbore;

receive the gamma ray radiation at the downhole tool at a backscatter (BS) detector, a short spacing (SS) detector, and a long spacing (LS) detector, resulting in measured energy;

produce, for the measured energy, a plurality of BS energy windows for the BS detector, a plurality of SS energy windows for the SS detector, and a plurality of LS energy windows for the LS detector;

using at least two of the plurality of BS energy windows, characterize casing properties of the casing, the casing properties including a BS casing thickness;

using the at least two of the plurality of BS energy windows, characterize an annulus density indicator of the annulus;

using a pre-determined database of open hole conditions and the measured energy, identify a plurality of SS apparent densities, each of the plurality of SS apparent densities associated with an associated SS energy window of the plurality of SS energy windows;

using the pre-determined database of the open hole conditions and the measured energy, identify a plurality of LS apparent densities, each of the plurality of LS apparent densities associated with an associated LS energy window of the plurality of SS energy windows;

combining the plurality of LS apparent densities and the plurality of SS apparent densities, resulting in combined apparent density; and using the casing properties of the casing and the annulus density indicator, apply a correction to the combined apparent density, resulting in a corrected annulus density.

* * * * *